United States Patent
Volker et al.

(10) Patent No.: US 7,100,987 B2
(45) Date of Patent: Sep. 5, 2006

(54) RECLINING VEHICLE SEAT HINGE ASSEMBLY

(75) Inventors: Otto J. Volker, Rochelle, IL (US); Nathan D. Lewis, Oregon, IL (US); Billy L. Larson, Elizabeth, IL (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/931,229

(22) Filed: Aug. 31, 2004

(65) Prior Publication Data

US 2006/0043778 A1     Mar. 2, 2006

(51) Int. Cl.
*B60N 2/02*     (2006.01)
(52) U.S. Cl. ....................................... 297/367
(58) Field of Classification Search ................ 297/367
See application file for complete search history.

(56) References Cited

U.S. PATENT DOCUMENTS

| | | | |
|---|---|---|---|
| 4,348,050 A | 9/1982 | Letournoux et al. | |
| 5,328,241 A * | 7/1994 | Haider | 297/367 |
| 5,590,931 A | 1/1997 | Fourrey et al. | 297/366 |
| 5,685,611 A * | 11/1997 | Eguchi et al. | 297/367 |
| 5,769,494 A | 6/1998 | Barrere et al. | 297/367 |
| 6,003,945 A | 12/1999 | Kojima | |
| 6,085,386 A * | 7/2000 | Blanchard et al. | 16/325 |
| 6,095,608 A | 8/2000 | Ganot et al. | |
| 6,102,480 A | 8/2000 | Asano | |
| 6,325,458 B1 | 12/2001 | Rohee et al. | |
| 6,328,382 B1 | 12/2001 | Yamashita | |
| 6,328,383 B1 | 12/2001 | Rohee et al. | 297/367 |
| 6,332,649 B1 | 12/2001 | Vossmann | |
| 6,390,557 B1 | 5/2002 | Asano | |
| 6,454,354 B1 | 9/2002 | Vossmann et al. | |
| 6,561,585 B1 | 5/2003 | Cilliere et al. | 297/367 |
| 6,626,495 B1 | 9/2003 | Okazaki et al. | |
| 6,669,297 B1 | 12/2003 | Cilliere et al. | |
| 6,676,217 B1 | 1/2004 | Lange | |
| 6,715,836 B1 | 4/2004 | Chen et al. | |
| 6,722,738 B1 | 4/2004 | Uramichi | |

(Continued)

FOREIGN PATENT DOCUMENTS

EP     1 225 085     7/2002

(Continued)

OTHER PUBLICATIONS

U.S. Appl. No. 10/656,908, filed Sep. 5, 2003.

(Continued)

*Primary Examiner*—Peter M. Cuomo
*Assistant Examiner*—Sarah B. McPartlin
(74) *Attorney, Agent, or Firm*—Peter D. McDermott; Banner & Witcoff Ltd.; Dean B. Watson

(57) ABSTRACT

A reclining vehicle seat hinge assembly includes a first housing, a second housing having a plurality of teeth, a primary cam member having primary and secondary camming surfaces, a primary spring, and a secondary cam having at least one spring arm and a plurality of windows, with each window having at least one camming edge. Each of a pair of primary pawls is configured to be driven into an engaged position by a primary camming surface of the primary cam and a camming edge, and into a disengaged position by a camming edge of the secondary cam. Each of a pair of secondary pawls is configured to be driven into an engaged position by a secondary camming surface of the primary cam and into a disengaged position by a camming edge of the secondary cam.

50 Claims, 12 Drawing Sheets

U.S. PATENT DOCUMENTS

| | | |
|---|---|---|
| 6,742,844 B1 | 6/2004 | Pollack |
| 2002/0017811 A1* | 2/2002 | Cilliere et al. ............... 297/367 |
| 2002/0043855 A1* | 4/2002 | Lange ........................ 297/367 |
| 2002/0125756 A1 | 9/2002 | Asano |
| 2002/0171279 A1* | 11/2002 | Pleskot ....................... 297/367 |
| 2003/0025377 A1 | 2/2003 | Peters |
| 2003/0230923 A1* | 12/2003 | Uramichi ................... 297/367 |
| 2004/0061369 A1* | 4/2004 | Reubeuze et al. .......... 297/367 |

FOREIGN PATENT DOCUMENTS

GB    2117440 A  * 10/1983

OTHER PUBLICATIONS

US 6,648,413, 11/2003, Uramichi (withdrawn)

* cited by examiner

RECLINING VEHICLE SEAT HINGE ASSEMBLY

FIELD OF THE INVENTION

This invention relates generally to a reclining vehicle seat hinge assembly, and, in particular, to a reclining vehicle seat hinge assembly with improved performance and functionality.

BACKGROUND OF THE INVENTION

Reclining vehicle seat hinge assemblies are well known in the art, and typically include pawls with a plurality of teeth that releasably engage a circular set of teeth in a housing attached to the seat. Upon movement of a lever, the pawl teeth are released from engagement with the housing teeth, allowing the user to pivot the seat back to a desired position. When the desired position is reached, the lever is released and the pawl teeth engage the housing teeth, locking the seat back at the desired position. Many known reclining vehicle seat hinge assemblies include a pair of pawls with teeth that engage the housing teeth. Such assemblies with just a pair of pawls must have a substantial thickness in order to provide the strength required to absorb the impact forces that result when the vehicle is involved in a collision.

It is an object of the present invention to provide a reclining vehicle seat hinge assembly that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

In accordance with a first aspect, a reclining vehicle seat hinge assembly includes a first housing and a second housing rotatable with respect to the first housing and having a circular shoulder and a plurality of teeth extending radially inward from the shoulder. A primary cam member is rotatable with respect to the first housing and has a pair of primary camming surfaces and a pair of secondary camming surfaces. A primary spring is engageable with the primary cam member to bias the primary cam member into an engaged position. A secondary cam member is rotatably driveable by the primary cam member. The secondary cam member has at least one spring arm engageable with the primary spring to rotatably bias the secondary cam with respect to the primary cam member and a plurality of windows, with each window having at least one camming edge. Each of a pair of diametrically opposed primary pawls has a plurality of radially outwardly extending teeth and is configured to be driven radially outward initially by engagement of a primary camming surface with a cam engaging surface of the primary pawl and then by engagement of a first cam engaging member on the primary pawl with a second camming edge of a window into an engaged position where the teeth of the primary pawl engage with the teeth of the second housing. Each primary pawl is driven radially inwardly by engagement of a first camming edge of a window with the first cam engaging member into a disengaged position where the teeth of the primary pawl are free of the teeth of the second housing. Each of a pair of diametrically opposed secondary pawls has a plurality of radially outwardly extending teeth and is configured to be driven radially outward by engagement of a secondary camming surface with a cam engaging surface of the secondary pawl into an engaged position where the teeth of the secondary pawl engage with the teeth of the second housing. Each secondary pawl is driven radially inwardly by engagement of a window with a first cam engaging member into a disengaged position where the teeth of the secondary pawl are free of the teeth of the second housing.

In accordance with another aspect, a reclining vehicle seat assembly includes a seat pan and a seat back pivotally connected to the seat pan. A hinge assembly pivotally connects the seat back to the seat pan and includes a first housing and a second housing rotatable with respect to the first housing and having a circular shoulder and a plurality of teeth extending radially inward from the shoulder. A primary cam member is rotatable with respect to the first housing and has a pair of primary camming surfaces and a pair of secondary camming surfaces. A primary spring is engageable with the primary cam member to bias the primary cam member into an engaged position. A secondary cam member is rotatably driveable by the primary cam member, with the secondary cam member having at least one spring arm engageable with the primary spring to rotatably bias the secondary cam with respect to the primary cam member and a plurality of windows, with each window having at least one camming edge. Each of a pair of diametrically opposed primary pawls has a plurality of radially outwardly extending teeth and is configured to be driven radially outwardly initially by engagement of a primary camming surface with a cam engaging surface of the primary pawl and then by engagement of a first cam engaging member on the primary pawl with a second camming edge of a window into an engaged position where the teeth of the primary pawl engage with the teeth of the second housing. Each primary pawl is driven radially inwardly by engagement of a first camming edge of a window with the first cam engaging member into a disengaged position where the teeth of the primary pawl are free of the teeth of the second housing. Each of a pair of diametrically opposed secondary pawls has a plurality of radially outwardly extending teeth and is configured to be driven radially outwardly by engagement of a secondary camming surface with a cam engaging surface of the secondary pawl into an engaged position where the teeth of the secondary pawl engage with the teeth of the second housing, and to be driven radially inward by engagement of a window with a first cam engaging member into a disengaged position where the teeth of the secondary pawl are free of the teeth of the second housing.

In accordance with a further aspect, a reclining vehicle seat hinge assembly includes a first housing having a plurality of guide surfaces formed thereon and a bearing ring including a pair of diametrically opposed gaps, with each gap defining a pair of stopping faces. A second housing is rotatable with respect to the first housing and includes a circular shoulder, a plurality of teeth extending radially inward from the shoulder, and a groove that receives the bearing ring, with the groove including a pair of diametrically opposed stops that engage the stopping faces to restrict rotation of the second housing with respect to the first housing. A primary cam member is rotatable with respect to the first housing and has a plurality of flanges that form a pair of primary camming surfaces and a pair of secondary camming surfaces. A pair of primary springs is engageable with the primary cam member to bias the primary cam member into an engaged position. A secondary cam member is rotatably driveable by the primary cam member, with the secondary cam member having at least one spring arm engageable with ribs formed on the primary cam member to rotatably bias the secondary cam with respect to the primary cam member and a plurality of windows, with each window having at least one camming edge. Each of a pair of diametrically opposed primary pawls is slidable along a pair of guide surfaces and has a plurality of radially outwardly extending teeth and is configured to be driven radially outwardly initially by engagement of a primary camming surface with a cam engaging surface of the primary pawl and then by engagement of a first cam engaging member on the primary pawl with a second camming edge of a window into an engaged position where the teeth of the primary pawl engage with the teeth of the second housing. Each primary pawl is driven radially inwardly by engagement of a first camming edge of a window with the first cam engaging member into a disengaged position where the teeth of the primary pawl are free of the teeth of the second housing. Each of a pair of diametrically opposed secondary pawls is slidable along a pair of guide surfaces and has a plurality of radially outwardly extending teeth and is configured to be driven radially outward by engagement of a secondary camming surface with a cam engaging surface of the secondary pawl into an engaged position where the teeth of the secondary pawl engage with the teeth of the second housing. Each secondary pawl is driven radially inwardly by engagement of a window with a first cam engaging member into a disengaged position where the teeth of the secondary pawl are free of the teeth of the second housing.

Substantial advantage is achieved by providing a reclining vehicle seat hinge assembly having a primary pair of pawls and a secondary pair of pawls. Since four pawls are used, the thickness of the components of the hinge assembly can be reduced, reducing the weight of the hinge assembly. This is highly advantageous, since reducing the weight of vehicle components helps to achieve fuel efficiency. Further, the use of primary and secondary pairs of pawls may reduce chuck, that is, pivotal movement of the seat back relative to the seat pan when the seat back is in its engaged position. The primary pawls and secondary pawls are configured to be driven into engagement independently, ensuring that full engagement of both sets of pawls is realized for a wide range of manufacturing tolerances.

These and additional features and advantages of the invention disclosed here will be further understood from the following detailed disclosure of certain preferred embodiments.

Figure 1:
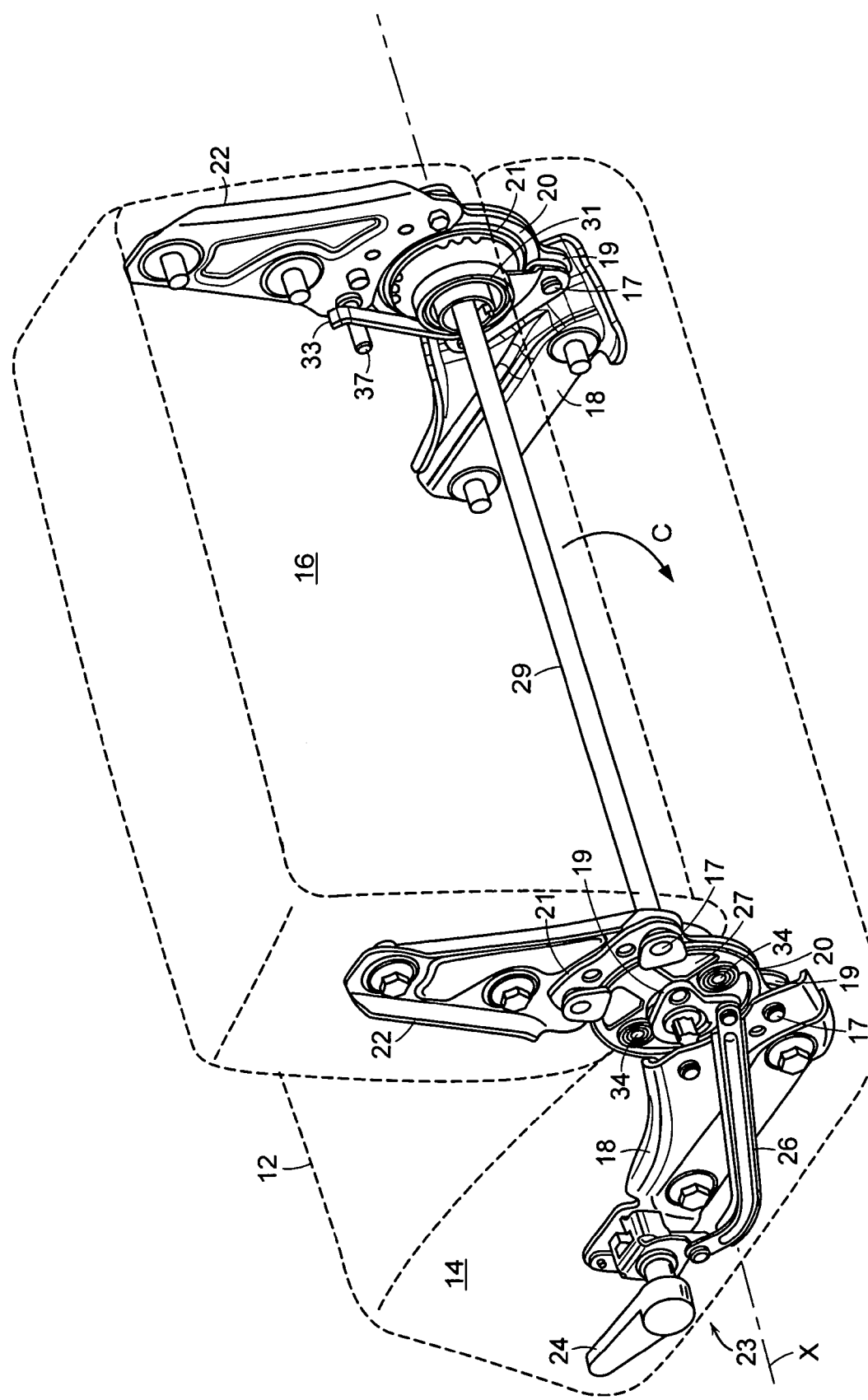
FIG. 1 is a perspective view, shown partially broken away, of a preferred embodiment of a hinge assembly of the present invention, shown installed on a vehicle seat.

The figures referred to above are not drawn necessarily to scale and should be understood to present a representation of the invention, illustrative of the principles involved. Some features of the reclining vehicle seat hinge assembly depicted in the drawings have been enlarged or distorted relative to others to facilitate explanation and understanding. The same reference numbers are used in the drawings for similar or identical components and features shown in various alternative embodiments. Reclining vehicle seat hinge assemblies as disclosed herein would have configurations and components determined, in part, by the intended application and environment in which they are used.

DETAILED DESCRIPTION OF CERTAIN PREFERRED EMBODIMENTS

The present invention may be embodied in various forms. A preferred embodiment of a hinge assembly 10 for a reclining vehicle seat 12 is shown in FIG. 1. Vehicle seat 12 has a seat pan 14 and a seat back 16, which is pivotally secured to seat pan 14 about a pivot axis X by hinge assembly 10. A first bracket or frame member 18 is secured at one end thereof to a first housing 20 of hinge assembly 10 by a pair of clamp rivets 17 that extend through apertures 15 in first housing 20 (seen in FIGS. 2–3). Shoulders 19 on clamp rivets 17 extend over the peripheral edge of first housing 20. A second end of first bracket 18 is secured to seat pan 14. Thus, hinge assembly 10 is rigidly secured to seat pan 14 by way of first frame member 18 and first housing 20. A second bracket or frame member 22 is secured at a first end thereof to a second housing 21 of hinge assembly 10 by a pair of clamp rivets 17 that extend through apertures 15 in second housing 21 (seen in FIGS. 2–3). Shoulders 19 on clamp rivets 17 extend over the peripheral edge of second housing 21. In other preferred embodiments, a plate with an aperture extending therethrough can be used in place of shoulders 19 on rivets 17. A second end of second bracket 22 is secured to seat back 16.

An actuator for hinge assembly 10, such as an actuating assembly 23, includes a lever 24 pivotally secured to seat pan 14. A first end of a link arm 26 is in turn pivotally secured to lever 24, and a second end of link arm 26 is pivotally secured to a bell crank 27 of hinge assembly 10. To regulate the amount that seat back 16 is reclined, a user grasps and pulls lever 24, placing hinge assembly 10 in a disengaged or unlocked position (described in greater detail below), which allows seat back 16 to pivot about axis X. Once seat back 16 is in the desired position, the user releases lever 24 and hinge assembly 10 returns to its engaged or locked position.

The hinge assembly 10 illustrated in the figures and discussed herein is a hinge assembly for an outboard side of a seat, namely a left hand hinge assembly for a left seat 12 of a vehicle. As seen here, a corresponding hinge assembly 10 is mounted to the right hand side of seat 12 and is a mirror image of hinge assembly 10, except that no actuating assembly 23 is required on the right hand, or inboard side, since only a single lever is required to operate the seat. Accordingly, an outboard hinge assembly for a right hand seat would be a mirror image of the hinge assembly 10 illustrated herein, and a corresponding inboard hinge assembly for a right hand seat would be identical to the hinge assembly illustrated herein, except that it would not require an actuating assembly.

A connecting rod 29 connects the left and right hinge assemblies 10 of a seat in known fashion. It is to be appreciated that in certain preferred embodiments, a lever, such as lever 24, may be directly connected to connecting rod 29, which would engage and drive hinge assembly 10 without the need for actuating assembly 23.

A seat return spring 31 is positioned on the inner side of hinge assembly 10, with an end 33 of seat return spring 31 engaging a rod 37 on second bracket 22 to bias seat back 16 into a forward position. When used herein, unless otherwise indicated, the term "inner" refers to the side of hinge assembly 10, or any other element, that is inboard with respect to the seat to which hinge assembly 10 is secured, that is, toward the interior of the vehicle with respect to the seat, and refers to an axial direction with respect to hinge assembly 10. Accordingly, the term "outer," unless otherwise indicated, refers to the side of hinge assembly 10, or any other element, that is outboard with respect to the seat, that is, toward the exterior of the vehicle, and refers to an axial direction with respect to hinge assembly 10.

Figure 2:
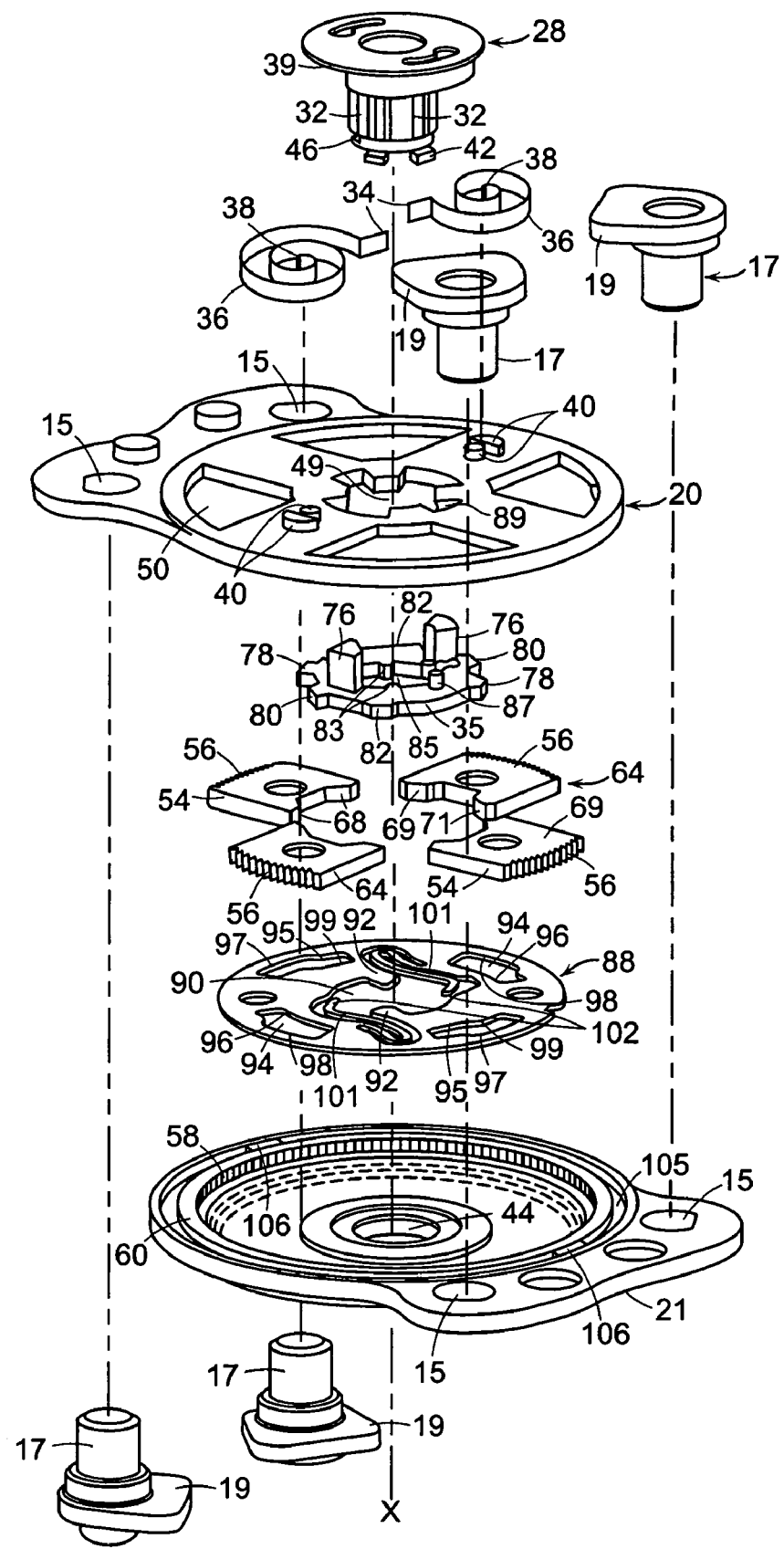
FIG. 2 is a perspective view, in exploded form, of the hinge assembly of FIG. 1.
Figure 3:
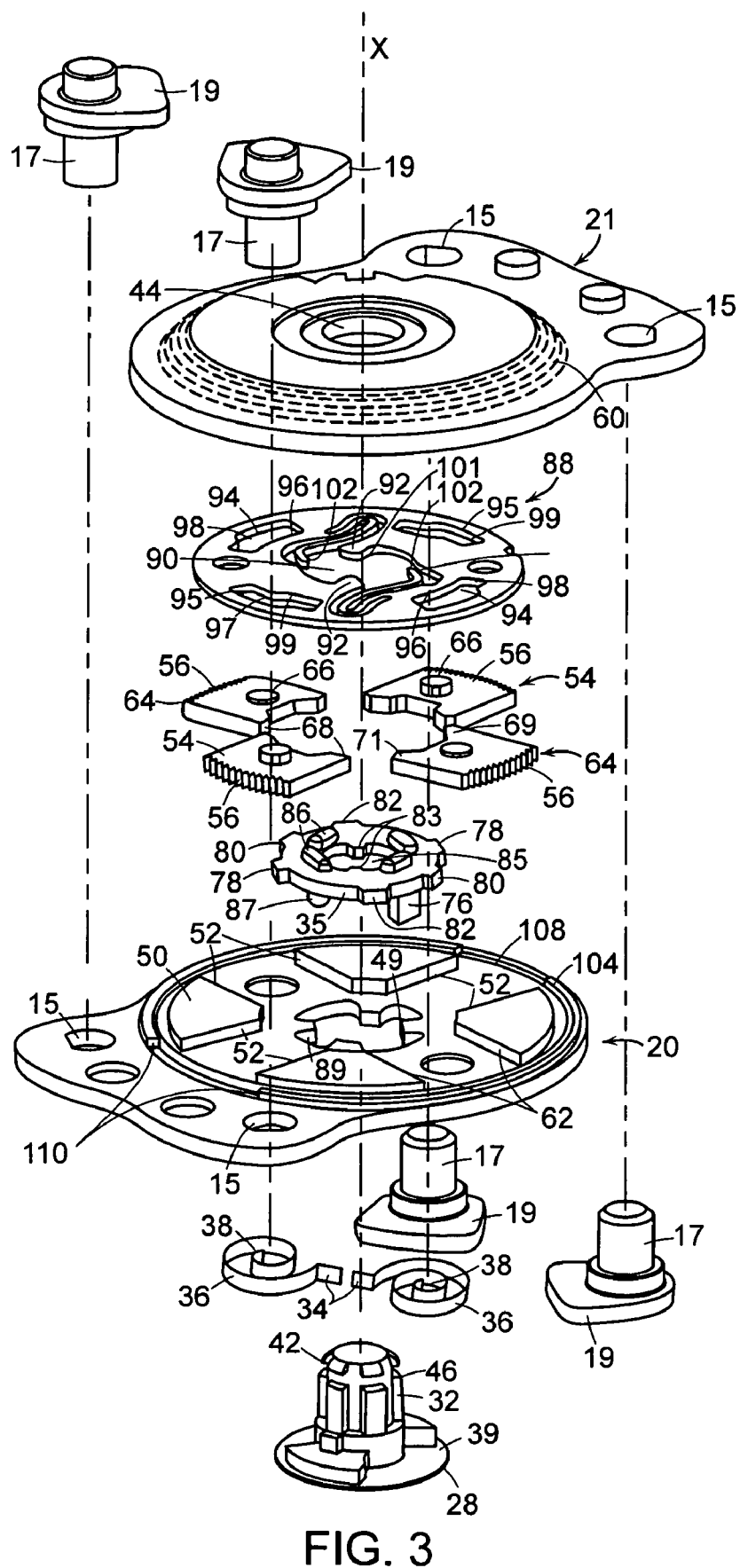
FIG. 3 is a perspective view, in exploded form, of the hinge assembly of FIG. 1.

Hinge assembly 10 is shown in exploded form in FIGS. 2–3. A cam locking member 28 is positioned on an outer side of hinge assembly 10, and has gaps 39 formed therein. First ends 34 of a pair of primary springs 36 extend through gaps 39 and engage a primary cam 35, as described in greater detail below. Second ends 38 of primary springs 36 are positioned between a pair of projections 40 formed on first housing 20, thereby rotatably securing primary springs 36 to first housing 20.

A plurality of radially outward extending tabs 42 are formed proximate an inner end of cam locking member 28, with an annular groove 46 formed adjacent tabs 42. Annular groove 46 and tabs 42 cooperate in a snap-fit manner with a central bore 44 formed on second housing 21 to retain the components of hinge assembly 10 together when hinge assembly 10 is in its assembled condition. Axial slots 32 in cam locking member 28 allow the inner end of cam locking member 28 and tabs 42 to flex, such that tabs 42 can be snap fit onto bore 44. In a preferred embodiment, cam locking member 28 is formed of plastic; however, other suitable materials will become readily apparent to those skilled in the art, given the benefit of this disclosure.

It is to be appreciated that although the illustrated embodiment shows a pair of primary springs 36, certain preferred embodiments may have a single primary spring, or more than two primary springs, which are anchored to first housing 20. As discussed in greater detail below, primary springs 36 serve to bias primary cam 35 into an engaged position. In the illustrated embodiment, primary springs 36 are clock springs. It is to be appreciated that many types of springs or biasing members can be used for primary springs 36, each of which are considered to be within the scope of the present invention, including, for example, tension springs and disk springs. Other suitable biasing members will become readily apparent to those skilled in the art, given the benefit of this disclosure.

A central aperture 49 in first housing 20 receives cam locking member 28. Bosses 50 formed on an inner side of first housing 20 form pairs of primary guide surfaces 52 along which a pair of primary pawls 54 slide. Primary pawls 54 are preferably diametrically opposed from one another, and have a plurality of teeth 56 extending radially outward. Teeth 56 are configured to engage with a corresponding plurality of teeth 58 that extend radially inwardly from a shoulder 60 of second housing 21.

Bosses 50 also form pairs of secondary guide surfaces 62, along which each of a pair of secondary pawls 64 slides. In a preferred embodiment, secondary pawls 64 are diametrically opposed from one another, and are disposed 90° with respect to primary pawls 54 such that they travel in a direction substantially perpendicular to the direction of travel of primary pawls 54. Secondary pawls 64 also have a plurality of teeth 56 that extend radially outward, and which are configured to engage with teeth 58 of second housing 21. Primary and secondary pawls 54, 64 each have a first outwardly extending cam engaging member such as projection 66 on an outer surface thereof.

Primary pawls have a second cam engaging member such as a cam engaging surfaces 68, which are formed by flanges formed on radially inward edges thereof. It is to be appreciated that only one of the cam engaging surfaces 68 of each of primary pawls 54 is engaged by primary cam 35 during operation of hinge assembly 10. Secondary pawls 64 also have second cam engaging members such as cam engaging surfaces 69, which are also formed by flanges on radially inward edges thereof in this embodiment. Further, secondary pawls 64 have stop engaging surfaces 71, also formed by flanges on radially inward edges thereof.

Having two pairs of pawls allows for the elements of hinge assembly 10 to be constructed of thinner, and, consequently, lighter materials, which is advantageous in the assembly of motor vehicles. Additionally, having two pairs of pawls helps to reduce chuck, and provides additional resistance to impact forces. By configuring primary pawls 54 and secondary pawls 64 to be driven independently into engagement with teeth 58 of second housing 21, full engagement of both sets of pawls is ensured for a wide range of manufacturing tolerances.

Primary cam 35 is positioned inwardly of first housing 20 and receives cam locking member 28. In a preferred embodiment, primary cam 35 is a substantially planar circular member. A pair of lugs 76 extends radially outwardly from primary cam 35 and engages first ends 34 of primary springs 36. A pair of diametrically opposed primary camming flanges 78 is formed along the peripheral edge of primary cam 35, surfaces of which engage cam engaging surfaces 68 of primary pawls 54, as described in greater detail below.

A pair of diametrically opposed secondary camming surfaces 80 is formed along the peripheral edge of primary cam 35, each of which engages a cam engaging surface 69 of a secondary pawl 64, as described in greater detail below. A pair of diametrically opposed concentric stopping surfaces 82 is formed along the peripheral edge of primary cam 35, each of which serves to engage a stop engaging surface 71 of a secondary pawl 64 in the event that secondary pawls 64 move radially inward or rock due to excessive forces, as described in greater detail below.

A plurality of axially extending ribs 83 formed on a central aperture 85 of primary cam 35 (seen more clearly in FIG. 5) engage with slots 32 formed in cam locking member 28, allowing primary cam 35 to rotate with cam locking member 28. A pair of stops 87 extends axially outwardly from an outer side of primary cam 35, each of which is positioned in a recess 89 formed in central aperture 49 of first housing 20.

It is to be appreciated that cam locking member 28 and primary cam 35 on the mating hinge assembly on the right side of vehicle seat 12 may rotate independently of one another during engagement. Specifically, primary cam 35 may rotate more than cam locking member 28 on the right side, e.g., up to approximately 10° more in certain embodiments, in order to allow for full engagement of both sides of the vehicle seat when seat back twist is present.

A secondary cam 88 is positioned inwardly of primary and secondary pawls 54, 64. In a preferred embodiment, secondary cam 88 is a plate. Secondary cam plate 88 has a central aperture 90 that receives cam locking member 28 and a portion of primary cam 35. A pair of diametrically opposed flanges 92 is formed on aperture 90. Flanges 92 cooperate with ribs 83 of primary cam 35 to engage slots 32 of cam locking member 28. Thus, secondary cam plate 88 moves in unison with primary cam 35 as cam locking member 28 is rotated in an unlocking or disengaging direction.

Figure 6:
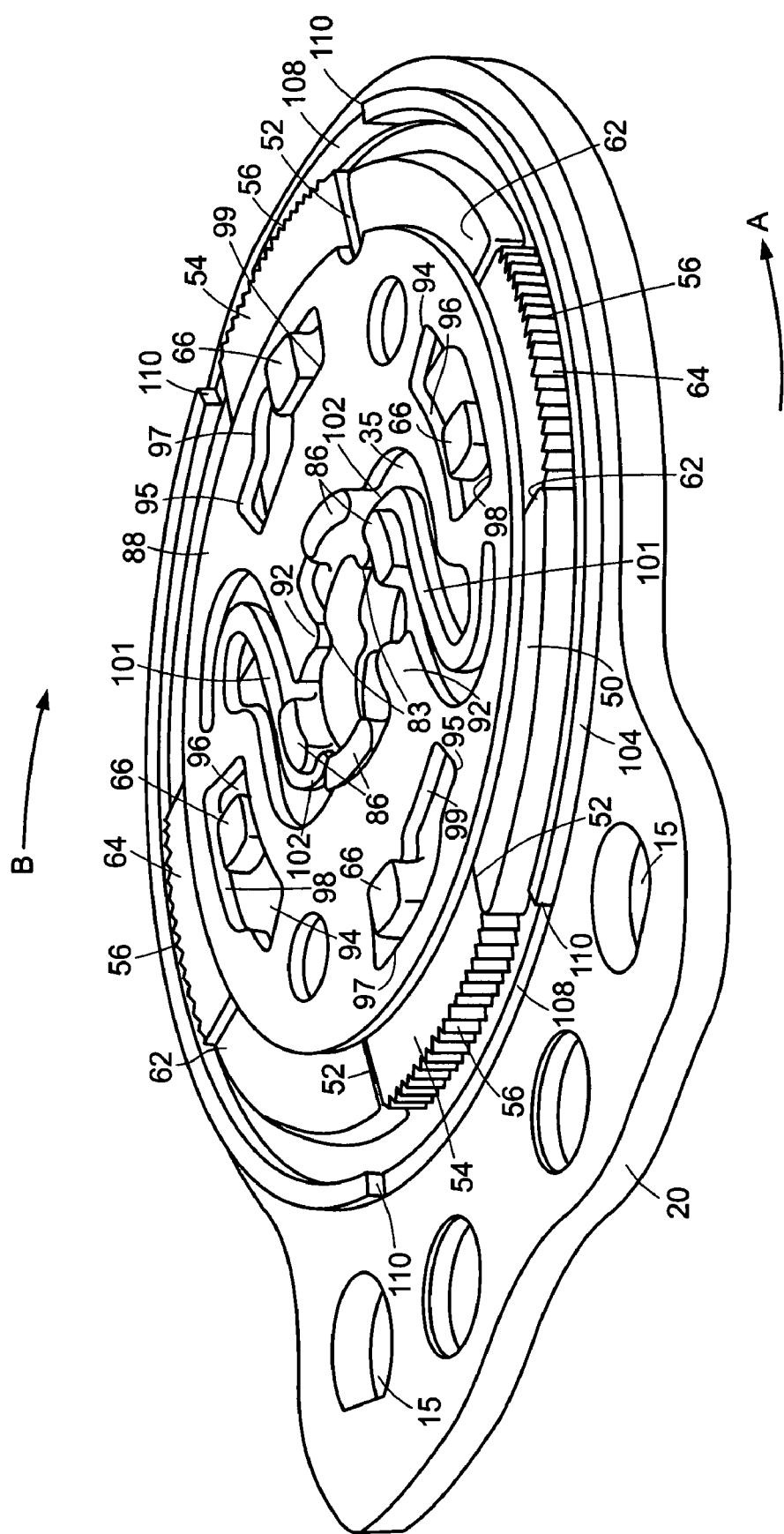
FIG. 6 is a perspective view of the hinge assembly of FIG. 1, shown partially assembled and illustrating the operation of the secondary cam and the primary and secondary pawls.

Secondary cam plate 88 has a first pair of diametrically opposed windows or slots 94 formed therein that extend substantially circumferentially, as seen more clearly in FIG. 6. Slots 94 have a first camming edge 96 and a second camming edge 98, each of camming edge 96 and 98 extending in a substantially circumferential direction along secondary cam plate 88, with second camming edge 98 positioned radially outward of first camming edge 96. As described in greater detail below, secondary camming surfaces 80 engage cam engaging surfaces 69 of secondary pawls 64 to force secondary pawls 64 radially outward into their engaged, or locked, position with teeth 58 of second housing 21 as primary cam 35 rotates in its engaging direction. Second camming edges 98 serve to force secondary pawls 64 into their disengaged, or unlocked, position, free from teeth 58 of second housing 21 as primary cam 35 rotates in its disengaging direction.

Secondary cam also has a second pair of diametrically opposed windows or slots 95 formed therein, extending substantially circumferentially, and disposed 90° from slots 94. The radially outward edge of each slot 95 is a first camming edge 97. As described in greater detail below, first camming edges 97 cooperate with projections 66 of primary pawls 54 to force primary pawls 54 into their disengaged, or unlocked, position, free from teeth 58 of second housing 21 as primary cam 35 rotates in its disengaging direction. The radially inward edge of each slot 95 is a second camming edge 99, which cooperates with a projection 66 of a primary pawl 54 to help move primary pawl 54 into its engaged, or locked, position with teeth 58 of second housing 21.

Secondary cam plate 88 also has a biasing member that serves to bias secondary cam plate 88 in a rotating manner with respect to primary cam 35. In the illustrated embodiment, secondary cam plate 88 has a pair of spring arms 101. Ends 102 of spring arms 101 are captured by ribs 86 that extend axially inwardly about a perimeter of central aperture 85 of primary cam 35 such that spring arms 101 act to bias secondary cam plate 88 with respect to primary cam 35.

Figure 4A:
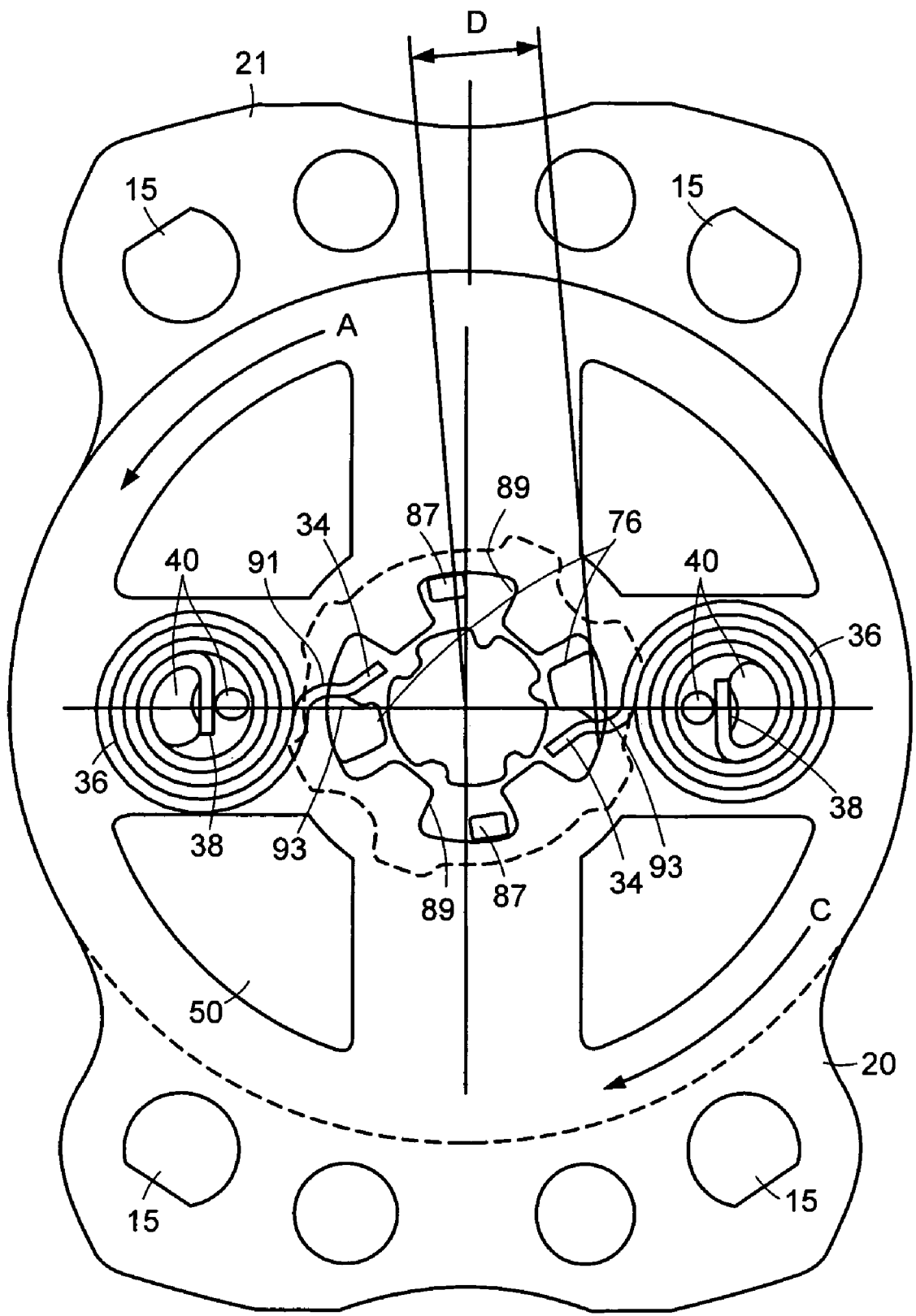
FIGS. 4A, B are elevation views of the hinge assembly of FIG. 1, showing engagement of primary springs with lugs of a primary cam.
Figure 4B:
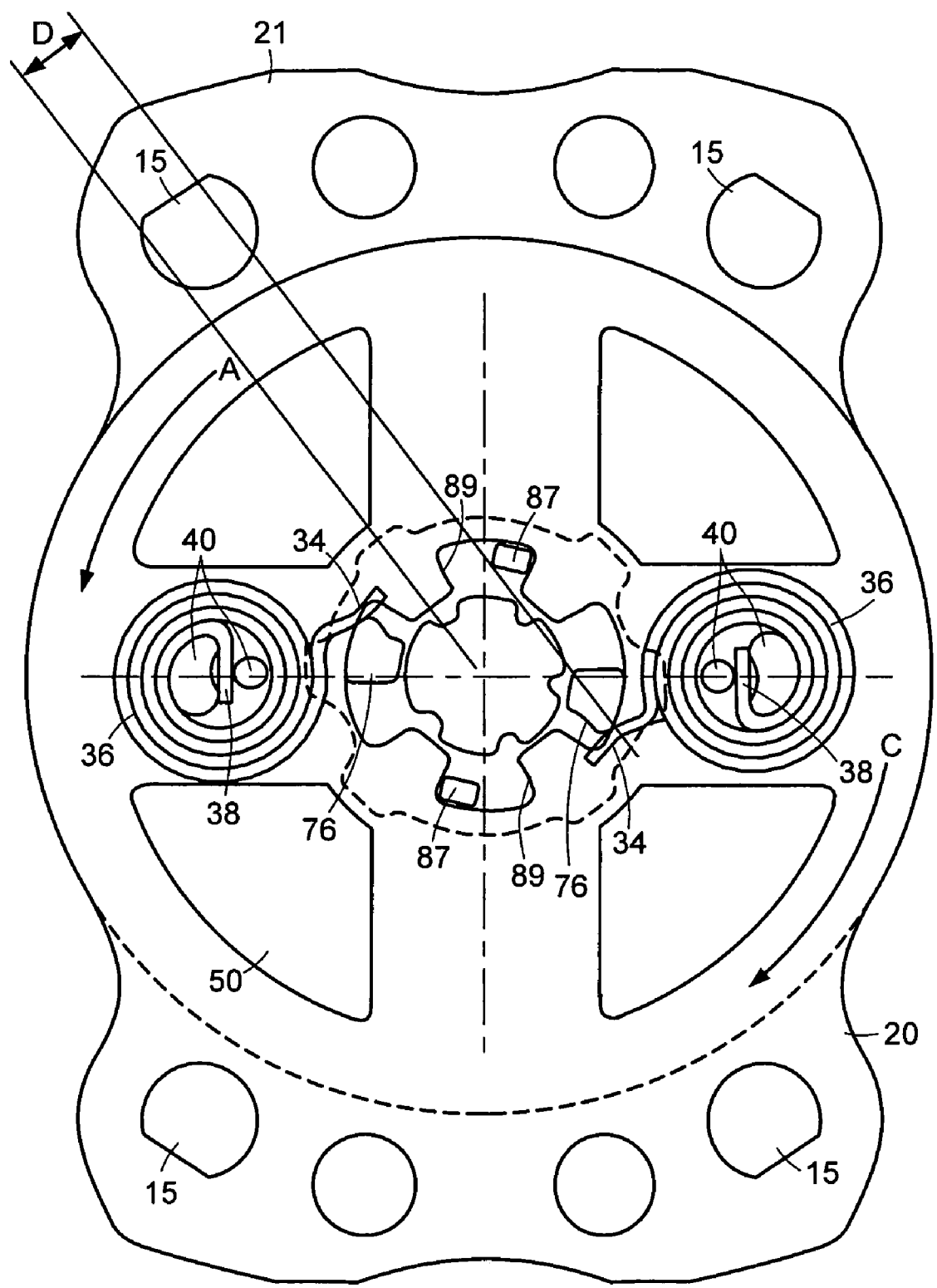

In the engaged, locked, or typical operating condition, as seen in FIGS. 4A, 4B, each second end 38 of the primary springs 36 is nested between a corresponding pair of projections 40 of first housing 20. Each first end 34 of the primary springs 36 engages a lug 76 of primary cam 35. The spring force of primary springs 36 biases primary cam 35 in the direction of arrow A, which is counter-clockwise as illustrated in FIGS. 4A, 4B. In the condition illustrated in FIG. 4A, primary camming flanges 78 of primary cam 35 are in an engaged position with cam engaging surfaces 68 of primary pawls 54, such that pawls 54 are in their radially outward position along primary guide surfaces 52, and teeth 56 of primary pawls 54 are engaged with teeth 58 of second housing 21.

As further seen in FIGS. 4A, 4B, first ends 34 of primary springs 36 have a slightly curved portion 91, which engages with a lug camming surface 93 on a corresponding lug 76. Lug camming surface 93 comprises a projection on the surface of lug 76 that engages first end 34 of primary spring 36. The geometry of curved portion 91 and lug camming surface 93 provides an increased moment in the locked, or engaged position, as illustrated in FIG. 4A. As seen in FIG. 4A, primary springs 36 act at a distance D that is greater than distance D in FIG. 4B, where hinge assembly 10 is in the unlocked, or disengaged, position and has a reduced moment. Thus, the clamping torque exerted by primary springs 36 is larger in the locked position, helping to ensure that pawls 54 remain engaged with teeth 58 of second housing 21. Further, the torque required for the user to rotate lever 24 and move hinge assembly 10 to the unlocked position is reduced since distance D decreases as primary cam 35 rotates to move from the engaged position to the disengaged position, making it easier for the user to rotate lever 24 to move seat back 16 than it would be without such a construction.

Figure 7:
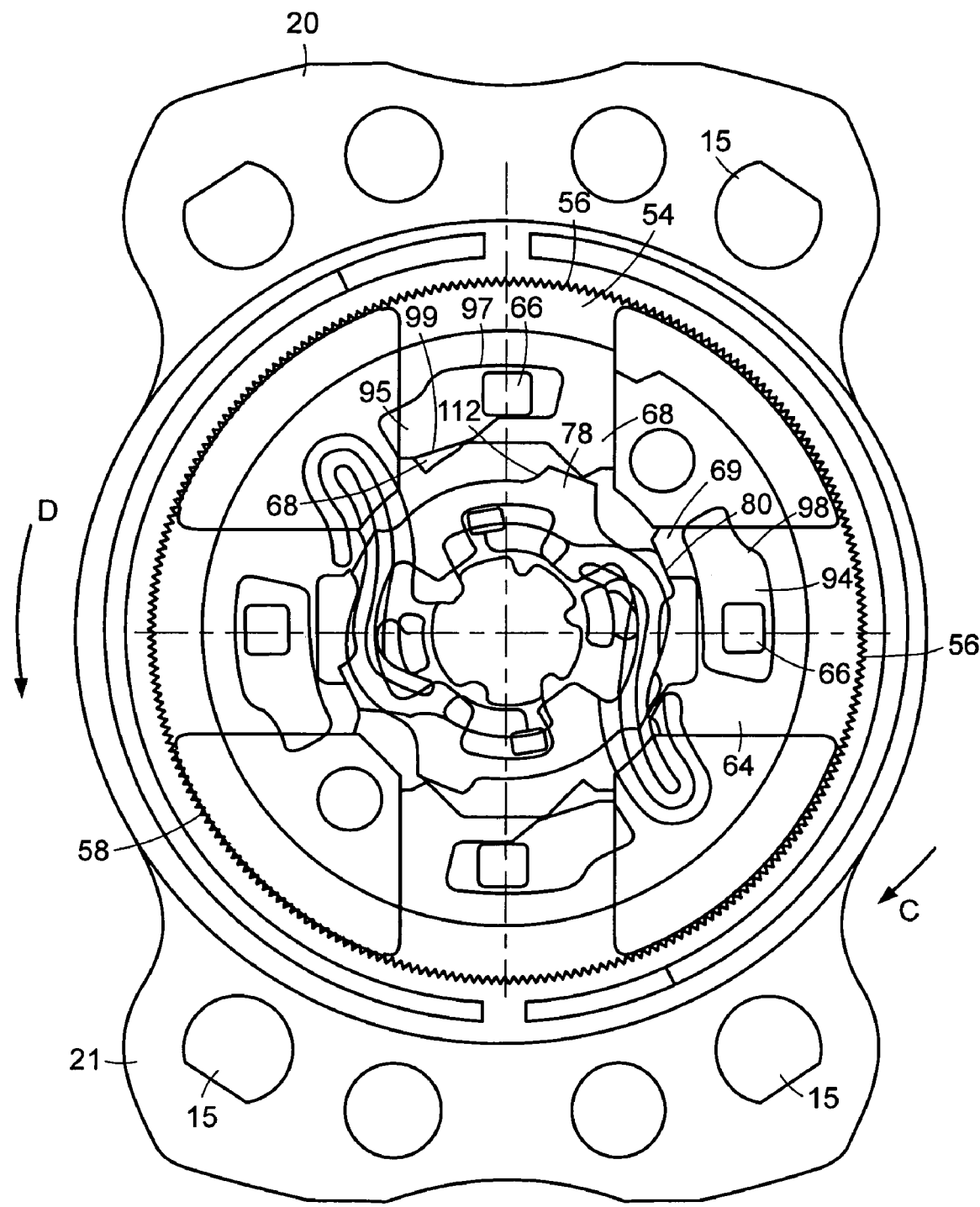
FIG. 7 is a schematic plan view of the hinge assembly of FIG. 1, shown with its primary and secondary pawls in their engaged or locked position.

As can be seen in FIGS. 6, 7, projections 66 of primary pawls 54 and secondary pawls 64 are positioned within slots 95, 94, respectively, of secondary cam plate 88. In the engaged, or locked position, as illustrated in FIGS. 6, 7, second camming edges 99 of slots 95 are engaged with projections 66 of primary pawls 54 to maintain primary pawls 54 in their radially outward positions, where teeth 56 of primary pawls 54 are engaged with teeth 58 of second housing 21.

As noted above, ends 102 of spring arms 101 of secondary cam plate 88 act on projections 86 of primary cam 35, biasing secondary cam plate 88 with respect to primary cam 35. As illustrated in FIG. 6, secondary cam plate 88 is biased in the direction of arrow A (counterclockwise as illustrated here).

Figure 5:
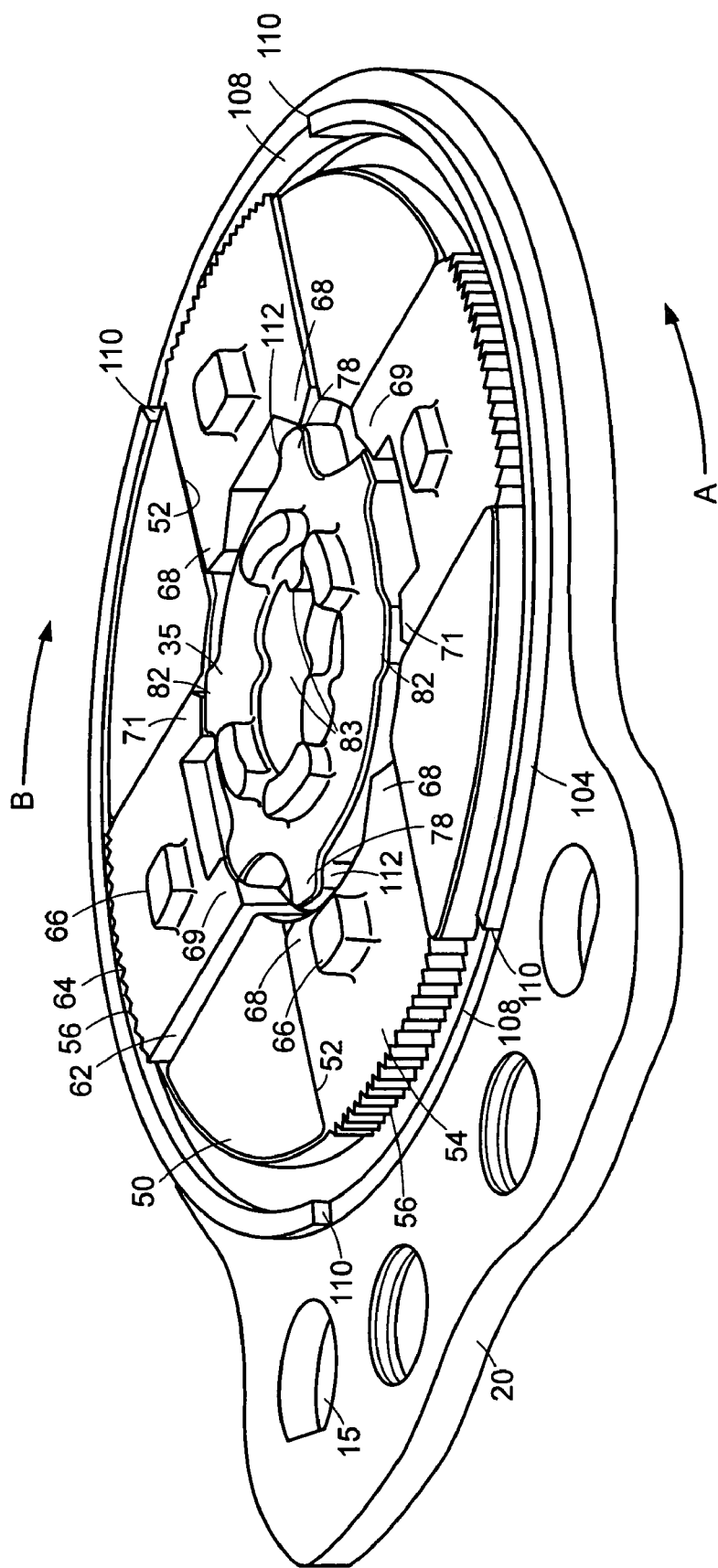
FIG. 5 is a perspective view of the hinge assembly of FIG. 1, shown partially assembled and illustrating the operation of the primary cam with the primary and secondary pawls.

As can be seen in FIGS. 5, 6, first housing 20 includes a bearing ring 104 extending axially inwardly about its periphery. Bearing ring 104 is seated and rides in a mating groove 105 formed in second housing 21, as seen in FIG. 2. As second housing 21 rotates with respect to first housing 20 as seat 12 is manipulated, bearing ring 104 moves within groove 105, taking load and helping to resist the intrusion of foreign objects into the components of hinge assembly 10. As seen in FIG. 2, groove 105 includes a pair of diametrically opposed stops 106. As seen in FIGS. 5, 6, a pair of diametrically opposed gaps 108 in bearing ring 104 form stopping faces 110 that engage stops 106 in groove 105 to help prevent excess travel of second housing 21 with respect to first housing 20. Bearing ring 104 with stopping faces 110 and groove 105 with stops 106 in first and second housings 20, 21, respectively, act as travel stops to limit the movement of second housing 21 with respect to first housing 20. By incorporating these travel stops on the housings themselves rather than on external brackets or other elements, a reduced tolerance variation is achieved to ensure that tooth engagement occurs at the travel stops.

As illustrated here, bearing ring 104 includes two opposed gaps 108, each substantially aligned with a primary pawl 54. In certain embodiments, the gaps 108 may be aligned with a boss 50 such that a portion of bearing ring 104 is aligned with each primary pawl. In certain embodiments, two additional gaps 108 (not shown) may also be positioned approximately 90° from the first pair of gaps 108 such that bearing ring 104 is composed of four segments. In such an embodiment, additional stops may be formed in groove 105. It is to be appreciated that in certain embodiments, these additional stops may be configured such that they do not engage a stopping face 110 of bearing ring 104 during operation of hinge assembly 10.

Figure 8:
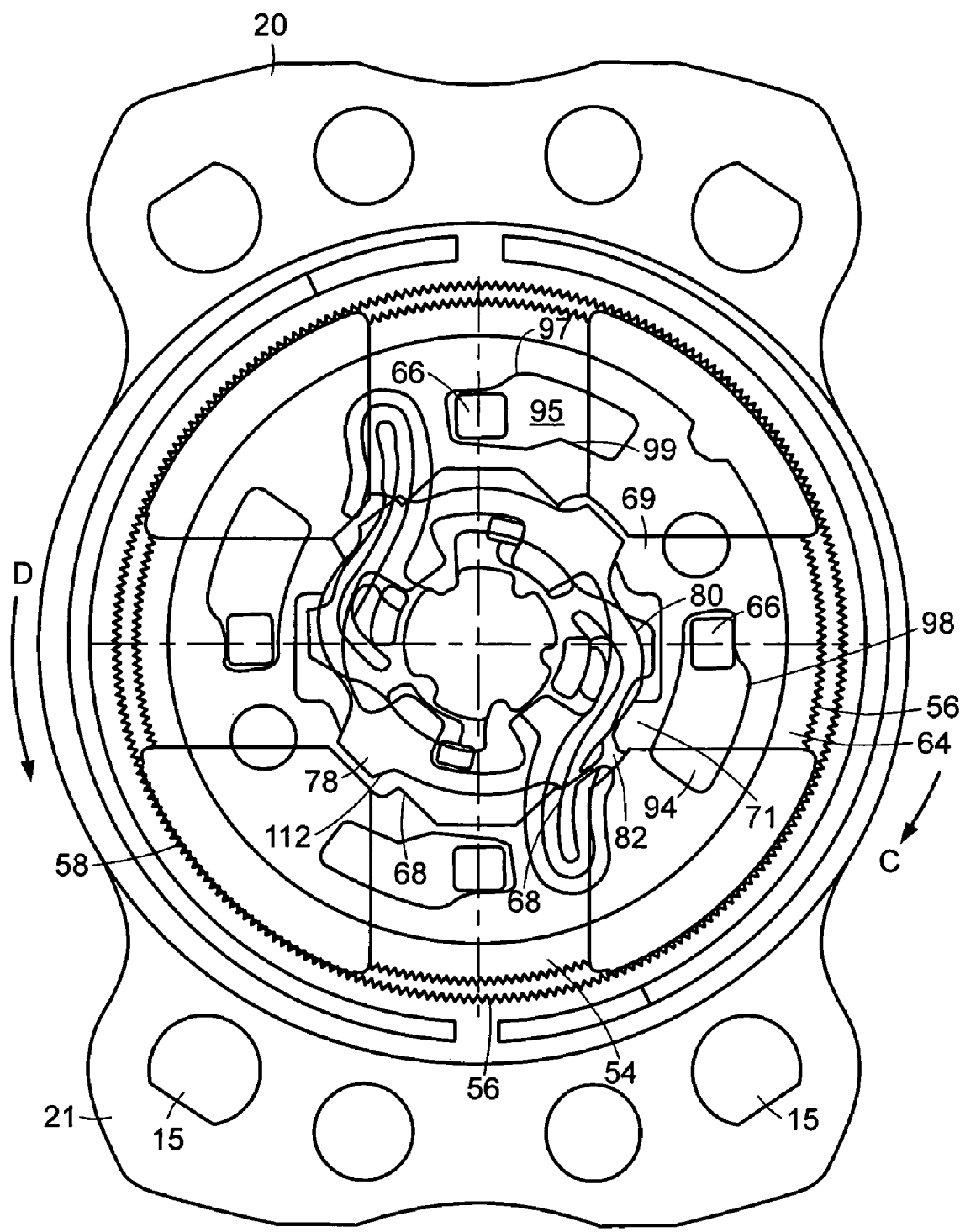
FIG. 8 is a schematic plan view of the hinge assembly of FIG. 1, shown with its primary and secondary pawls in their disengaged or unlocked position.

The operation of hinge assembly 10 will now be described. In order to adjust the position of seat back 16, primary pawls 54 and secondary pawls 64 must be moved from their engaged or locked position with teeth 58 of second housing 21, seen in FIGS. 6, 7, to their disengaged or unlocked position as seen in FIG. 8. As seen in FIG. 7, in the engaged position, second camming edges 99 of secondary cam plate 88 are engaged with projections 66 of primary pawls 54, maintaining teeth 56 of primary pawls 54 in their outboard position in engagement with teeth 58 of second housing 21. Additionally, secondary camming surfaces 80 of primary cam 35 are engaged with cam engaging surfaces 69 of secondary pawls 64, maintaining teeth 56 of secondary pawls 64 in their outboard position in engagement with teeth 58 of second housing 21. In the engaged position, stopping surfaces 82 of primary cam 35 are spaced slightly radially inwardly from stop engaging surfaces 71 of secondary pawls 64. In the event that secondary pawls 64 encounter forces or stresses that cause them to rock or pivot, stopping surfaces 82 will engage stop engaging surfaces 71 to prevent secondary pawls 64 from moving radially inwardly.

To disengage the pawls 54, 64 and allow seatback 16 to pivot, lever arm 24 is grasped and pulled by the user as seen in FIG. 1. Lever arm 24 acts through link arm 26 and bell crank 27 to rotate cam locking member 28, and necessarily primary cam 35, in a disengaging direction, against the biasing force of primary springs 36. As illustrated in FIGS. 1, 4A, 4B, 7–10, the disengaging direction for cam locking member 28 and primary cam 35 is clockwise in the direction of arrow C.

As primary cam 35 rotates in the disengaging direction, primary pawls 54 and secondary pawls 64 are moved radially inwardly. As secondary cam plate 88 rotates with primary cam 35, second camming surfaces 98 engage projections 66 of secondary pawls 64 to urge secondary pawls 64 radially inward, freeing teeth 56 of secondary pawls 64 from teeth 58 of second housing 21. Similarly, projections 66 of primary pawls 54 ride along first camming edges 97 of slots 95 such that primary pawls 54 are urged radially inward, freeing teeth 56 of primary pawls 54 from teeth 58 of second housing 21. Consequently, both primary pawls 54 and secondary pawls 64 are moved to their disengaged, or unlocked position, and seat back 16 is free to pivot with respect to seat pan 14.

Figure 9:
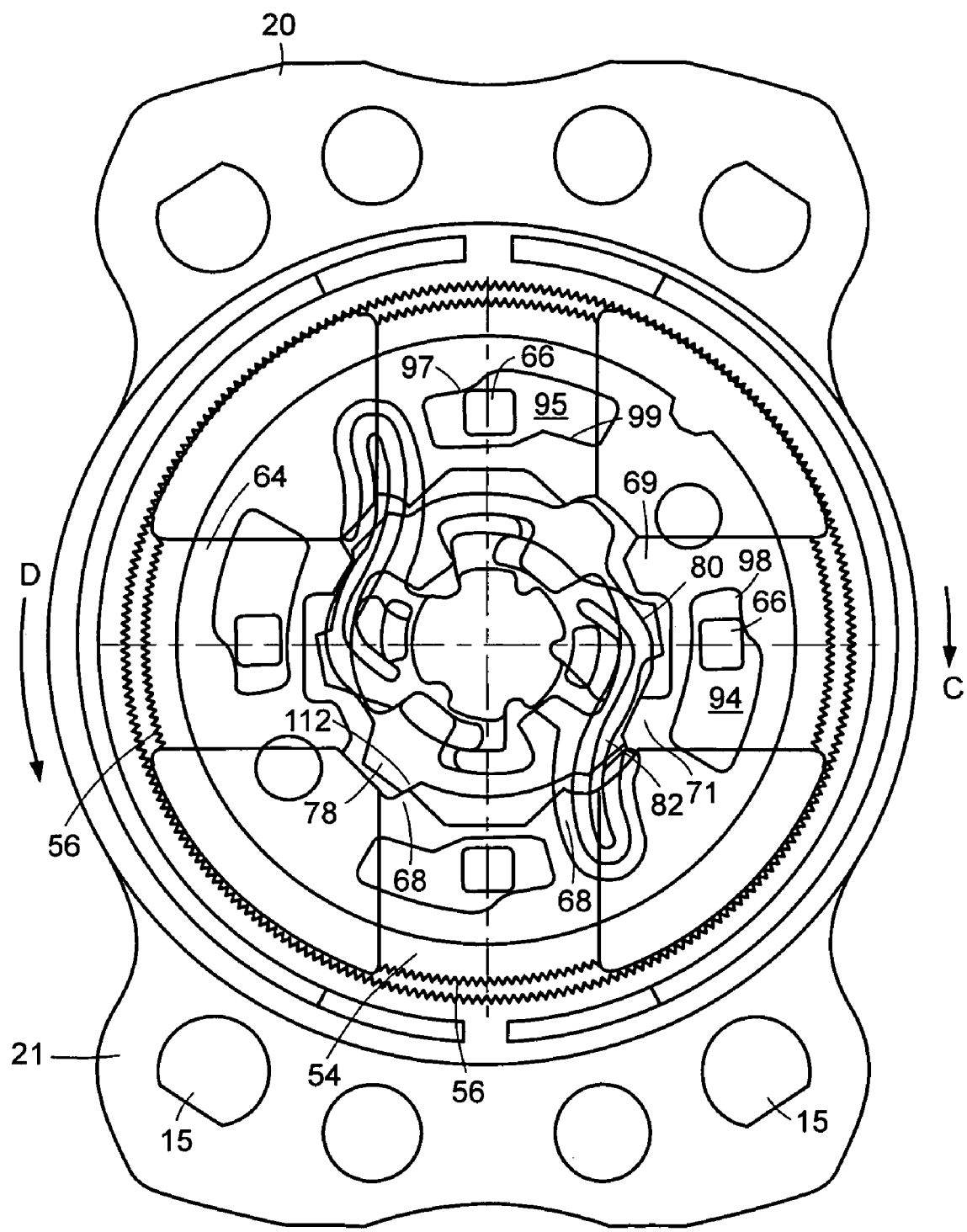
FIG. 9 is a schematic plan view of the hinge assembly of FIG. 1, shown with its primary cam beginning to engage its primary pawls into their engaged or locked position.
Figure 10:
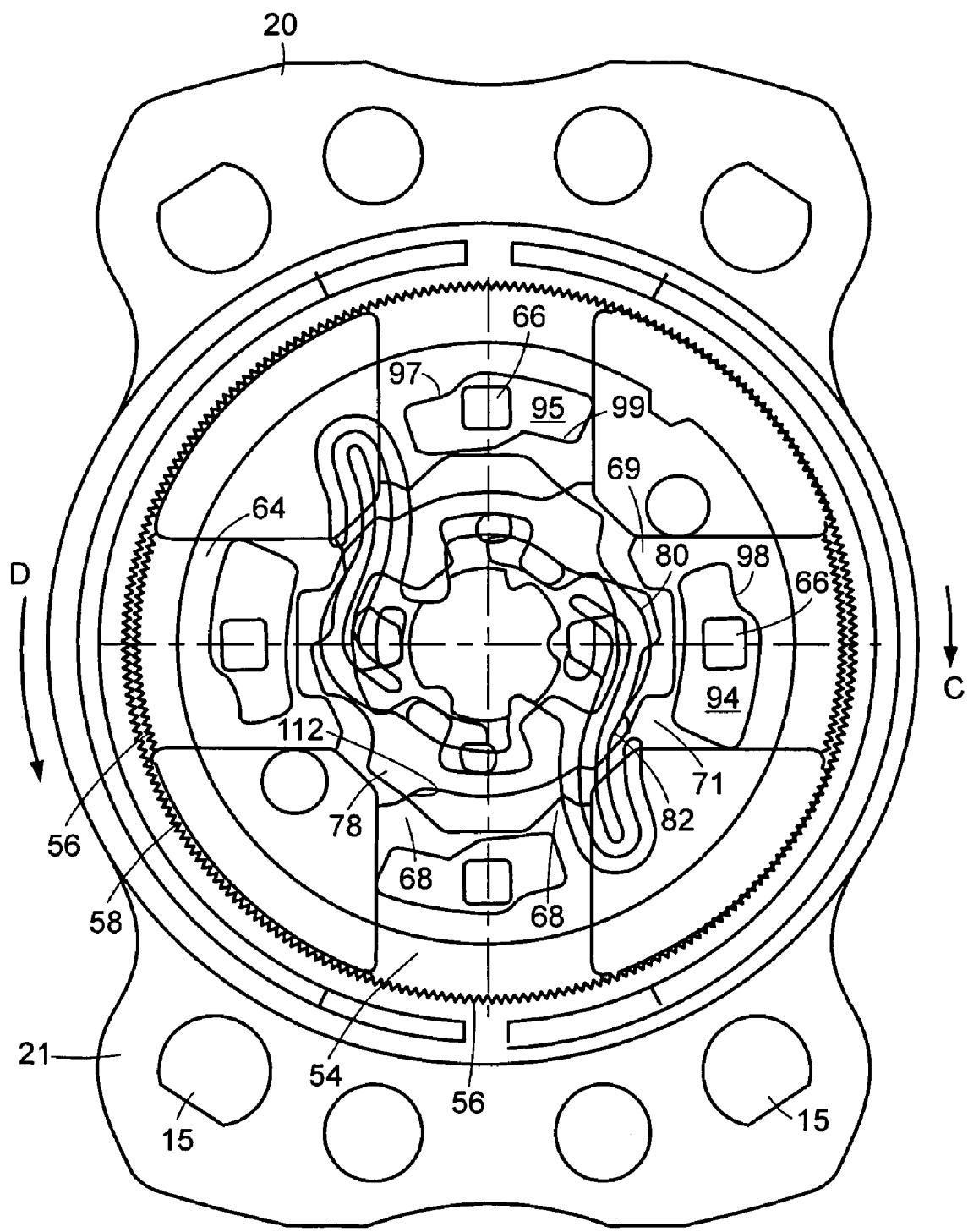
FIG. 10 is a schematic plan view of the hinge assembly of FIG. 1, shown with its primary cam engaging its primary pawls and just prior to engagement of the primary cam with the secondary pawls.

Once seat back 16 is pivoted to a desired position, lever 24 is released. Primary springs 36 consequently cause primary cam 35 to rotate in an engaging direction (counter-clockwise in the direction of arrow A in FIGS. 4A, 4B and in the direction of arrow D in FIGS. 7–10). As primary cam 35 begins to rotate, as seen in FIGS. 9–10, each cam engaging surface 112 of a primary camming flange 78 engages a cam engaging surface 68 of a primary pawl 54, forcing primary pawls 54 radially outwardly. As primary cam 35 continues to rotate further, second camming edge 99 of secondary cam plate 88 engages projections 66 of primary pawls 54, urging primary pawls 54 further outward into engagement with teeth 58 of second housing 21, as illustrated in FIG. 7. In this position, primary camming flanges 78 of primary cam 35 are positioned slightly radially inwardly from cam engaging surfaces 68 of primary pawls 68, providing backup support in the event that primary pawls 54 rock or pivot inwardly.

At the same time, secondary camming surfaces 80 of primary cam 35 engage cam engaging surfaces 69 of secondary pawls 64, urging secondary pawls 64 radially outward until teeth 56 of secondary pawls 64 engage teeth 58 of second housing 21. As noted above, in this engaged position, stopping surfaces 82 of primary cam 35 are positioned slightly radially inwardly of stop engaging surfaces 71 of secondary pawls 64, acting as backup support in the event that secondary pawls 64 rock or pivot inwardly.

In certain preferred embodiments, hinge assembly 10 is constructed such that as primary cam 35 rotates in the engaging direction, secondary pawls 64 engage teeth 58 slightly after primary pawls 54 engage teeth 58. Further, in certain preferred embodiments, as primary cam 35 rotates in the disengaging direction, primary pawls 54 are disengaged from teeth 58 at approximately the same time that secondary pawls 64 are disengaged from teeth 58. In other embodiments, secondary pawls 64 are disengaged slightly before primary pawls 54.

Figure 11:
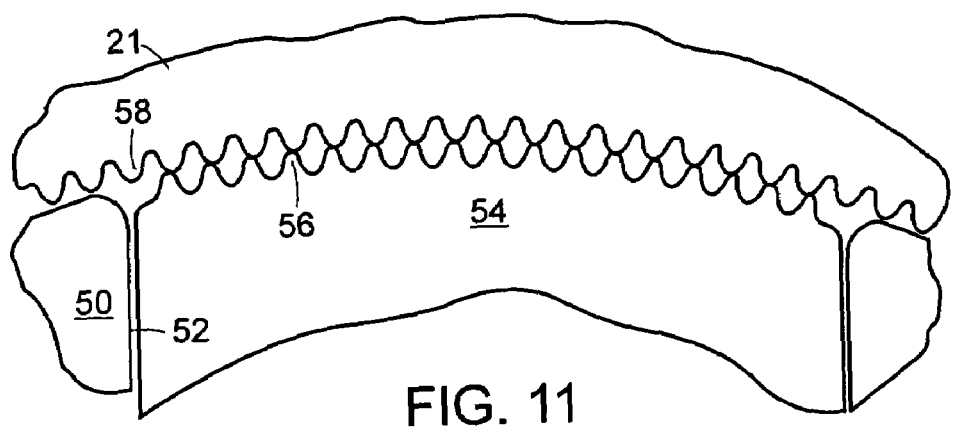
FIG. 11 is a plan view, shown partially broken away, of engagement of teeth of a primary pawl in tip-to-tip engagement with teeth of the second housing of the hinge assembly of FIG. 1.

In certain preferred embodiments, as illustrated in FIG. 11, the pitch of teeth 56 on primary pawls 54 is the same as the pitch of teeth 58 on second housing 21. In certain cases, as primary pawls 54 move radially outwardly, the tips of teeth 56 on primary pawls 56 may engage the tips of teeth 58 of second housing 21, preventing smooth engagement of teeth 56 with teeth 58. As seen in FIG. 11, the outermost teeth 56 on primary pawls are on opposed sides of the corresponding teeth 58 of second (the outer sides as seen here) and, therefore, are attempting to drive second housing 12 in opposite directions.

Figure 12:
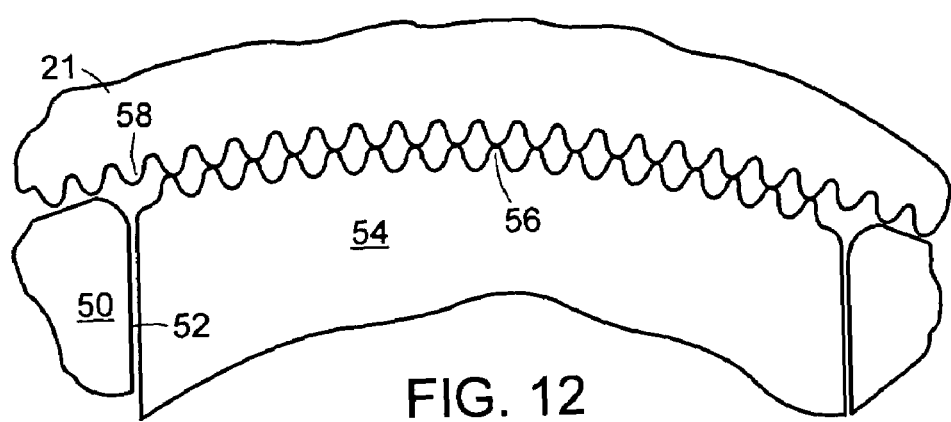
FIG. 12 is a plan view, shown partially broken away, of the teeth of a primary pawl just prior to engagement with the teeth of the second housing of the hinge assembly of FIG. 1, in an embodiment where the pitch of the teeth of the primary pawl is slightly smaller than the pitch of the teeth of the second housing.

In certain preferred embodiments, as illustrated in FIG. 12, the pitch of teeth 56 on primary pawls 54 is slightly less than the pitch of teeth 58 on second housing 21. This helps ensure that a single tooth 56 of primary pawl 54 directly engages a corresponding tooth 58 of second housing 21 as primary pawl 54 moves radially outwardly (seen here as the tooth labeled 56). Each of the other teeth is not quite in contact with a tooth 58 of second housing 21 at this point. At this point, the force of seat return spring 31 causes a small rotation of second housing 21, allowing each of the teeth 56 or primary pawls 54 to easily slide into full engagement with teeth 58 of second housing 21. In a preferred embodiment, the pitch of teeth 56 of primary pawls 54 is approximately 32.00 mm while the pitch of teeth 58 of second housing 21 is approximately 35.00 mm.

Figure 13:
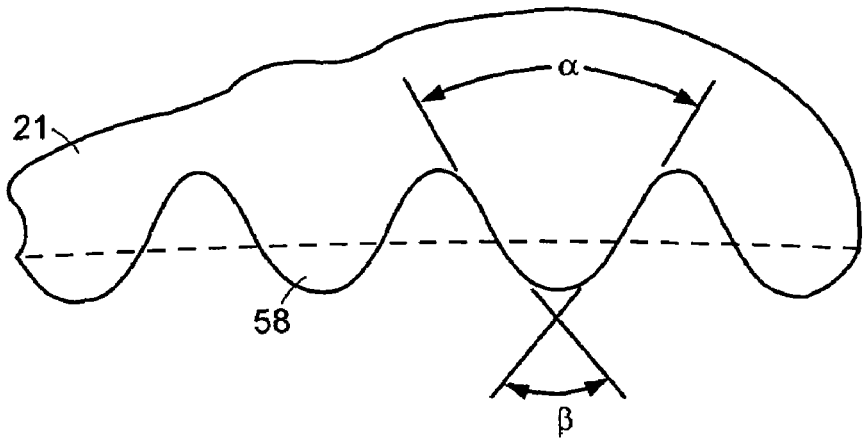
FIG. 13 is a plan view, shown partially broken away, of a preferred embodiment of the teeth of the second housing.

In certain preferred embodiments, as seen in FIG. 13, teeth 56 of second housing 21 have a design lock angle $\alpha$ while the tips of teeth 56 have an included angle $\beta$ that is larger than angle $\alpha$. This construction helps to reduce tip-to-tip interference of teeth 56 and 58 by changing the direction in which the force of seat return spring 31 acts. Thus, the force exerted on second housing 21 by seat return spring 31 is directed to act on teeth 56 of primary pawl 54 to help them mesh with teeth 58 of second housing 12. In a preferred embodiment, angle α is approximately 60° and angle β is approximately 80°.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A reclining vehicle seat hinge assembly comprising, in combination:
    a first housing;
    a second housing rotatable with respect to the first housing and having a circular shoulder and a plurality of teeth extending radially inward from the shoulder;
    a primary cam member rotatable with respect to the first housing and having a pair of primary camming surfaces and a pair of secondary camming surfaces;
    a primary spring engageable with the primary cam member to bias the primary cam member into an engaged position;
    a secondary cam member rotatably driveable by the primary cam member, the secondary cam member having at least one spring arm engageable with the primary spring to rotatably bias the secondary cam with respect to the primary cam member and a plurality of windows, with each window having at least one camming edge;
    a pair of diametrically opposed primary pawls, each primary pawl having a plurality of radially outwardly extending teeth and configured to be driven radially outwardly initially by engagement of a primary camming surface with a cam engaging surface of the primary pawl and then by engagement of a first cam engaging member on the primary pawl with a second camming edge of a window into an engaged position where the teeth of the primary pawl engage with the teeth of the second housing, and to be driven radially inwardly by engagement of a first camming edge of a window with the first cam engaging member into a disengaged position where the teeth of the primary pawl are free of the teeth of the second housing; and
    a pair of diametrically opposed secondary pawls, each secondary pawl having a plurality of radially outwardly extending teeth and configured to be driven radially outwardly by engagement of a secondary camming surface with a cam engaging surface of the secondary pawl into an engaged position where the teeth of the secondary pawl engage with the teeth of the second housing, and to be driven radially inwardly by engagement of a window with a first cam engaging member into a disengaged position where the teeth of the secondary pawl are free of the teeth of the second housing.

2. The reclining vehicle seat hinge assembly of claim 1, wherein the first cam engaging members are projections.

3. The reclining vehicle seat hinge assembly of claim 1, further comprising a pair of concentric stopping surfaces on the primary cam.

4. The reclining vehicle seat hinge assembly of claim 3, wherein each concentric stopping surface is spaced slightly radially inward of a stop engaging surface of a secondary pawl in the engaged position.

5. The reclining vehicle seat hinge assembly of claim 1, wherein the first housing has a plurality of guide surfaces along which the primary pawls and secondary pawls travel.

6. The reclining vehicle seat hinge assembly of claim 1, wherein the first housing includes a bearing ring having at least one gap, each gap defining a pair of slopping faces, and the second housing includes a groove that receives the bearing ring and includes at least one stop that engages the stopping faces to restrict rotation of the second housing with respect to the first housing.

7. The reclining vehicle seat hinge assembly of claim 1, wherein the primary spring comprises a pair of springs.

8. The reclining vehicle seat hinge assembly of claim 7, further comprising a pair of lugs formed on the primary cam, each lug engageable with a first end of one of the springs.

9. The reclining vehicle seat hinge assembly of claim 8, wherein the first end of each spring includes a curved portion and each lug includes a camming surface engageable with a corresponding curved portion of a first end of a spring.

10. The reclining vehicle seat hinge assembly of claim 1, wherein each primary camming surface is spaced slightly radially inward of a cam engaging surface of the primary pawl in the engaged position.

11. The reclining vehicle seat hinge assembly of claim 1, wherein each primary camming surface is formed by a flange on the primary cam.

12. The reclining vehicle seat hinge assembly of claim 1, wherein a pitch of the teeth of each primary pawl is slightly less than a pitch of the teeth of the second housing.

13. The reclining vehicle seat hinge assembly of claim 1, wherein tips of the teeth of the second housing have an included angle that is greater than that of drive faces of the teeth of the second housing.

14. The reclining vehicle seat hinge assembly of claim 13, wherein the tips of the teeth of the second housing have an included angle of approximately 80° and the drive faces of the teeth of the second housing have an included angle of approximately 60°.

15. A reclining vehicle seat assembly comprising, in combination:
    a seat pan;
    a seat back pivotally connected to the seat pan; and
    a hinge assembly pivotally connecting the seat back to the seat pan and comprising
        a first housing;
        a second housing rotatable with respect to the first housing and having a circular shoulder and a plurality of teeth extending radially inward from the shoulder;
        a primary cam member rotatable with respect to the first housing and having a pair of primary camming surfaces and a pair of secondary camming surfaces;
        a primary spring engageable with the primary cam member to bias the primary cam member into an engaged position;
        a secondary cam member rotatably driveable by the primary cam member, the secondary cam member having at least one spring arm engageable with the primary spring to rotatably bias the secondary cam with respect to the primary cam member and a plurality of windows, with each window having at least one camming edge;
        a pair of diametrically opposed primary pawls, each primary pawl having a plurality of radially outwardly extending teeth and configured to be driven radially outwardly initially by engagement of a primary camming surface with a cam engaging surface of the primary pawl and then by engagement of a first cam engaging member on the primary pawl with a second camming edge of a window into an engaged position where the teeth of the primary pawl engage with the teeth of the second housing, and to be driven radially inwardly by engagement of a first camming edge of a window with the first cam engaging member into a disengaged position where the teeth of the primary pawl are free of the teeth of the second housing; and a pair of diametrically opposed secondary pawls, each secondary pawl having a plurality of radially outwardly extending teeth and configured to be driven radially outwardly by engagement of a secondary camming surface with a cam engaging surface of the secondary pawl into an engaged position where the teeth of the secondary pawl engage with the teeth of the second housing, and to be driven radially inwardly by engagement of a window with a first cam engaging member into a disengaged position where the teeth of the secondary pawl are free of the teeth of the second housing.

16. The reclining vehicle seat assembly of claim 15, further comprising a seat return spring configured to urge the seat back into a forward position.

17. The reclining vehicle seat assembly of claim 15, wherein the first cam engaging members are projections.

18. The reclining vehicle seat assembly of claim 15, further comprising a pair of concentric stopping surfaces on the primary cam.

19. The reclining vehicle seat assembly of claim 18, wherein each concentric stopping surface is spaced slightly radially inward of a stop engaging surface of a secondary pawl in the engaged position.

20. The reclining vehicle seat assembly of claim 15, wherein the first housing has a plurality of guide surfaces along which the primary pawls and secondary pawls travel.

21. The reclining vehicle seat assembly of claim 15, wherein the first housing includes a bearing ring having at least one gap, each gap defining a pair of stopping faces, and the second housing includes a groove that receives the bearing ring and includes at least one stop that engages the stopping faces to restrict rotation of the second housing with respect to the first housing.

22. The reclining vehicle seat assembly of claim 15, wherein the primary spring comprises a pair of springs.

23. The reclining vehicle seat assembly of claim 22, further comprising a pair of lugs formed on the primary cam, each lug engageable with a first end of one of the springs.

24. The reclining vehicle seat assembly of claim 23, wherein the first end of each spring includes a curved portion and each lug includes a camming surface engageable with a corresponding curved portion of a first end of a spring.

25. The reclining vehicle seat assembly of claim 15, wherein each primary camming surface is spaced slightly radially inward of a cam engaging surface of the primary pawl in the engaged position.

26. The reclining vehicle seat assembly of claim 15, wherein each primary camming surface is formed by a flange on the primary cam.

27. A reclining vehicle seat hinge assembly comprising, in combination:
a first housing having a plurality of guide surfaces formed thereon and a bearing ring including a pair of diametrically opposed gaps, each gap defining a pair of stopping faces;
a second housing rotatable with respect to the first housing and including a circular shoulder, a plurality of teeth extending radially inward from the shoulder, and a groove that receives the bearing ring, the groove including a pair of diametrically opposed stops that engage the stopping faces to restrict rotation of the second housing with respect to the first housing;
a primary cam member rotatable with respect to the first housing and having a plurality of flanges that form a pair of primary camming surfaces and a pair of secondary camming surfaces;
a pair of primary springs engageable with the primary cam member to bias the primary cam member into an engaged position;
a secondary cam member rotatably driveable by the primary cam member, the secondary cam member having at least one spring arm engageable with ribs formed on the primary cam member to rotatably bias the secondary cam with respect to the primary cant member and a plurality of windows, with each window having at least one camming edge;
a pair of diametrically opposed primary pawls, each primary pawl slidable along a pair of guide surfaces and having a plurality of radially outwardly extending teeth and configured to be driven radially outwardly initially by engagement of a primary camming surface with a cam engaging surface of the primary pawl and then by engagement of a first cam engaging member on the primary pawl with a second camming edge of a window into an engaged position where the teeth of the primary pawl engage with the teeth of the second housing, and to be driven radially inwardly by engagement of a first camming edge of a window with the first cam engaging member into a disengaged position where the teeth of the primary pawl are free of the teeth of the second housing; and
a pair of diametrically opposed secondary pawls, each secondary pawl slidable along a pair of guide surfaces and having a plurality of radially outwardly extending teeth and configured to be driven radially outwardly by engagement of a secondary camming surface with a cam engaging surface of the secondary pawl into an engaged position where the teeth of the secondary pawl engage with the teeth of the second housing, and to be driven radially inwardly by engagement of a window with a first cam engaging member into a disengaged position where the teeth of the secondary pawl are free of the teeth of the second housing.

28. A reclining vehicle seat hinge assembly comprising:
a first housing, the first housing including a bearing ring extending axially inwardly about its periphery;
a second housing rotatable with respect to the first housing and having a circular shoulder and a plurality of teeth extending radially inward from the shoulder;
a primary cam member rotatable with respect to the first housing;
a primary spring engageable with the primary cam member for biasing the primary cam member into an engaged position;
a secondary cam member rotatably drivable by the primary cam member;
a pair of primary pawls, each primary pawl having a plurality of radially outwardly extending teeth adapted to engage the plurality of teeth of the second housing; and
a pair of secondary pawls, each secondary pawl having a plurality of radially outwardly extending teeth adapted to engage the plurality of teeth of the second housing;

wherein the bearing ring of the first housing is disposed radially outboard in relation to the plurality of teeth of the second housing and engages a surface of the second housing facing the first housing.

29. The reclining vehicle seat hinge assembly of claim 28, wherein the primary cam member includes a pair of primary camming surfaces and a pair of secondary camming surfaces.

30. The reclining vehicle seat hinge assembly of claim 29, wherein the secondary cam member includes at least one spring arm engageable with the primary cam member for rotatably biasing the secondary cam member with respect to the primary cam member.

31. The reclining vehicle seat hinge assembly of claim 30, wherein the secondary cam member includes a plurality of windows, each window having at least one camming edge.

32. The reclining vehicle seat hinge assembly of claim 31, wherein the primary and secondary pawls include projections formed thereon.

33. The reclining vehicle seat hinge assembly of claim 32, wherein the primary pawls are configured to be driven radially between engaged and disengaged positions, the primary pawls being moved initially outward by engagement of the primary camming surface of the primary cam member with the cam engaging surface of the primary pawl followed by engagement of the projection on the primary pawl with the at least one camming edge of the window into the engaged position where the teeth of the primary pawls engage the teeth formed on the second housing.

34. The reclining vehicle seat hinge assembly of claim 33, wherein the primary pawls are moved radially inward by engagement of the at least one camming edge of the window with the projection on the primary pawl into the disengaged position where the teeth of the primary pawl are free of the teeth of the second housing.

35. The reclining vehicle seat hinge assembly of claim 33, wherein the secondary pawls are configured to be driven radially between engaged and disengaged positions, the secondary pawls being moved outward by engagement of the secondary camming surface of the primary earn member with the cam engaging surface of the secondary pawl into the engaged position where the teeth of the secondary pawls engage the teeth formed on the second housing.

36. The reclining vehicle seat hinge assembly of claim 35, wherein the secondary pawls are moved radially inward by engagement of the at least one camming edge of the window with the projection on the secondary pawl into the disengaged position where the teeth of the secondary pawl are free of the teeth of the second housing.

37. The reclining vehicle seat hinge assembly of claim 28, wherein the primary cam includes a pair of concentric stopping surfaces formed thereon.

38. The reclining vehicle seat hinge assembly of claim 37, wherein each concentric stopping surface is spaced slightly radially inward of a stop engaging surface of a secondary pawl in the engaged position.

39. The reclining vehicle seat hinge assembly of claim 38, wherein the bearing ring includes at least one gap, each gap defining a pair of stopping faces.

40. The reclining vehicle seat hinge assembly of claim 39 wherein the second housing includes a groove that receives the bearing ring and includes at least one stop that engages the stopping faces to restrict rotation of the second housing with respect to the first housing.

41. The reclining vehicle seat hinge assembly of claim 28, wherein the first housing includes a plurality of guide surfaces along which the primary pawls and secondary pawls travel.

42. The reclining vehicle seat hinge assembly of claim 28, wherein the primary spring comprises a pair of springs.

43. The reclining vehicle seat hinge assembly of claim 42, including a pair of lugs formed on the primary cam, each lug engageable with a first end of one of the pair of springs.

44. The reclining vehicle seat hinge assembly of claim 43, wherein the first end of each spring includes a curved portion and each lug includes a camming surface engageable with a corresponding curved portion of a first end of a spring.

45. The reclining vehicle seat hinge assembly of claim 28, wherein each primary camming surface is spaced slightly radially inward of a cam engaging surface of the primary pawl in the engaged position.

46. The reclining vehicle seat hinge assembly of claim 28, wherein each primary camming surface comprises a flange formed on the primary cam member.

47. The reclining vehicle seat hinge assembly of claim 28, wherein a pitch of the teeth of each primary pawl is slightly less than a pitch of the teeth of the second housing.

48. The reclining vehicle seat hinge assembly of claim 28, wherein tips of the teeth of the second housing have an included angle that is greater than that of drive faces of the teeth of the second housing.

49. The reclining vehicle seat hinge assembly of claim 48, wherein the tips of the teeth of the second housing have an included angle of approximately 80 degrees and the drive faces of the teeth of the second housing have an included angle of approximately 60 degrees.

50. A reclining vehicle seat hinge assembly comprising:
   a first housing, the first housing including a bearing ring extending axially inwardly about its periphery;
   a second housing rotatable with respect to the first housing and having a circular shoulder and a plurality of teeth extending radially inward from the shoulder;
   a primary cam member rotatable with respect to the first housing;
   a primary spring engageable with the primary cam member for biasing the primary cam member into an engaged position;
   a secondary cam member rotatably drivable by the primary cam member;
   a pair of primary pawls, each primary pawl having a plurality of radially outwardly extending teeth adapted to engage the plurality of teeth of the second housing; and
   a pair of secondary pawls, each secondary pawl having a plurality of radially outwardly extending teeth adapted to engage the plurality of teeth of the second housing;
   wherein the secondary cam member includes at least one spring arm engageable with the primary cam member for biasing the secondary cam with respect to the primary cam.

* * * * *